United States Patent
Manoylova et al.

(10) Patent No.: US 10,265,689 B2
(45) Date of Patent: Apr. 23, 2019

(54) AGE-RESISTANT CATALYST FOR OXIDATION OF NO TO $NO_2$ IN EXHAUST STREAMS

(71) Applicant: Süd-Chemie AG, München (DE)

(72) Inventors: Olga Manoylova, München (DE); Markus Hutt, München (DE); Klaus Wanninger, Kolbermoor (DE); Arno Tißler, Tegernheim (DE)

(73) Assignee: CLARIANT PRODUKTE (DEUTSCHLAND) GMBH, Frankfurt am Main (DE)

( * ) Notice: Subject to any disclaimer, the term of this patent is extended or adjusted under 35 U.S.C. 154(b) by 0 days.

(21) Appl. No.: 14/976,791

(22) Filed: Dec. 21, 2015

(65) Prior Publication Data

US 2016/0214096 A1    Jul. 28, 2016

Related U.S. Application Data

(63) Continuation of application No. 13/260,860, filed as application No. PCT/EP2010/054035 on Mar. 26, 2010, now abandoned.

(30) Foreign Application Priority Data

Mar. 30, 2009    (DE) .................. 10 2009 015 592

(51) Int. Cl.
| | | |
|---|---|---|
| *B01J 29/06* | (2006.01) | |
| *B01J 29/74* | (2006.01) | |
| *B01J 29/12* | (2006.01) | |
| *B01J 35/04* | (2006.01) | |
| *B01J 37/02* | (2006.01) | |
| *B01D 53/94* | (2006.01) | |
| *B01J 29/068* | (2006.01) | |
| *B01J 37/08* | (2006.01) | |
| *B01J 37/16* | (2006.01) | |
| *B01J 37/18* | (2006.01) | |

(52) U.S. Cl.
CPC ........ *B01J 29/7415* (2013.01); *B01D 53/944* (2013.01); *B01D 53/945* (2013.01); *B01J 29/068* (2013.01); *B01J 29/12* (2013.01); *B01J 29/123* (2013.01); *B01J 29/126* (2013.01); *B01J 29/743* (2013.01); *B01J 29/7446* (2013.01); *B01J 29/7469* (2013.01); *B01J 29/7484* (2013.01); *B01J 35/04* (2013.01); *B01J 37/02* (2013.01); *B01J 37/0201* (2013.01); *B01J 37/0203* (2013.01); *B01J 37/08* (2013.01); *B01J 37/16* (2013.01); *B01D 2255/1021* (2013.01); *B01D 2255/50* (2013.01); *B01D 2258/012* (2013.01); *B01J 37/0246* (2013.01); *B01J 37/18* (2013.01); *B01J 2229/186* (2013.01); *Y02T 10/22* (2013.01)

(58) Field of Classification Search
CPC .... B01J 29/068; B01J 29/7415; B01J 29/743; B01J 29/7446; B01J 29/12; B01J 29/123; B01J 29/126; B01J 29/7469; B01J 29/7484; B01J 2229/186; B01J 35/04; B01J 37/02; B01J 37/08; B01J 37/18; B01J 37/0246; B01J 37/16
USPC .......................... 502/63, 64, 71, 74, 75, 85
See application file for complete search history.

(56) References Cited

U.S. PATENT DOCUMENTS

| | | | |
|---|---|---|---|
| 4,519,120 A | 5/1985 | Nonnenmenn et al. | |
| 4,882,307 A * | 11/1989 | Tsao ..................... | B01J 29/7415 502/66 |
| 4,912,072 A * | 3/1990 | Mallouk ................ | B01J 29/068 502/66 |
| 5,208,203 A | 5/1993 | Horiuchi et al. | |
| 5,330,945 A * | 7/1994 | Beckmeyer .......... | B01D 53/944 502/64 |
| 5,804,155 A | 9/1998 | Farrauto et al. | |
| 5,849,255 A | 12/1998 | Sawyer et al. | |
| 5,911,961 A | 6/1999 | Horiuchi et al. | |
| 5,928,981 A | 7/1999 | Leyrer et al. | |
| 6,069,286 A * | 5/2000 | Wu ....................... | B01J 29/7415 208/111.01 |
| 6,274,107 B1 | 8/2001 | Yavuz et al. | |
| 7,332,454 B2 | 2/2008 | Dang et al. | |
| 8,609,570 B2 * | 12/2013 | Schwarzer ........... | B01D 53/944 502/104 |
| 8,685,876 B2 * | 4/2014 | Schwarzer ........... | B01D 53/944 502/262 |
| 2006/0035780 A1* | 2/2006 | Xu ....................... | B01D 53/945 502/66 |

FOREIGN PATENT DOCUMENTS

| | | |
|---|---|---|
| DE | 28 56 030 | 6/1980 |
| DE | 10 2008 023472 | 11/2009 |

(Continued)

OTHER PUBLICATIONS

PCT International Search Report for PCT/EP2010/054035, dated Aug. 3, 2010.

(Continued)

*Primary Examiner* — Elizabeth D Wood

(57) ABSTRACT

The present invention relates to a zeolite comprising platinum. The invention furthermore relates to a method for producing said zeolite comprising platinum according to the invention, to the use of said zeolite as an oxidation catalyst and hydrocarbon reservoir and to a catalyst component comprising the zeolite according to the invention.

14 Claims, 2 Drawing Sheets

(56) References Cited

FOREIGN PATENT DOCUMENTS

| EP | 0 049 489 | 4/1982 |
| EP | 0 691 883 | 1/1996 |
| EP | 0 800 856 | 10/1997 |
| EP | 0 830 201 | 3/1998 |
| WO | 1996/40419 | * 12/1996 |
| WO | WO 2009/138204 | 11/2009 |

OTHER PUBLICATIONS

PCT International Preliminary Report on Patentability for PCT/EP2010/054035, dated Oct. 4, 2011.

EP 0 049 489 English Abstract, Apr. 14, 1982.

F. Dornhaus et al., "New Platinum/Palladium based catalyzed filter technologies for future passenger car applications", 5th International Exhaust Gas and Particulate Emissions Forum, 2008, pp. 127-144. Feb. 19-20, 2008.

A. Grossale et al., The chemistry of the $NO/NO_2$-$NH_3$ 'fast' SCR reaction over Fe-ZSM5 investigated by transient reaction analysis. Journal of Catalysis, vol. 256, pp. 312-322. 2008.

C. Jimenez et al., "Hydroisonerization of a hydrocarbon feed containing n-hexane, n-heptane and cyclohexane on zeolite-supported platinum catalyst". Applied Catalysis A: General, vol. 249, pp. 175-185. 2003.

D.S. Coombs et al., "Recommended Nomenclature for Zeolite Minerals; report of the subcommittee on zeolites of the international mineralogical association, commission on new minerals and mineral names". The Canadian Mineralogist, vol. 35, pp. 1571-1606. 1997.

J.M. Garcia-Cortes et al., "On the structure sensitivity of $deNO_x$ HC-SCR over Pt-beta catalysts". Journal of Catalysis, vol. 218, pp. 111-122. 2003.

M. Jeguirim et al., "Catalytic effect of platinum on the kinetics of carbon oxidation by $NO_2$ and $O_2$". Applied catalysis B: Environmental, vol. 76, pp. 235-240. 2007.

M. Schwidder et al., "The role of $NO_2$ in the selective catalytic reduction of nitrogen oxides over Fe-ZSM-5 catalysts: Active sites for the conversion of NO and of $NO/NO_2$ mixtures", Journal of Catalysis, vol. 259, pp. 96-103. 2008.

J. Choo et al., "Oxidation characteristics of airborne carbon nanoparticles by $NO_2$". Science of the Total Environment, vol. 405, pp. 396-401. 2008.

J. Perez-Ramirez et al., "Characterization and performance of Pt-USY in the SCR of $NO_x$ with hydrocarbons under lean-burn conditions". Applied Catalysis B: Environmental, vol. 29, pp. 285-298. 2001.

K. Yamamoto et al., "Simulation on soot deposition and combustion in diesel particulate filter". Proceedings of the Combustion Institute, vol. 32, pp. 1965-1972. 2009.

* cited by examiner

Rate of CO conversion

NO₂ yield

IR spectra of PSA-BEA and PtEA-BEA before and after the poisoning with 1-adamantane carbonitrile

AGE-RESISTANT CATALYST FOR OXIDATION OF NO TO NO$_2$ IN EXHAUST STREAMS

The present invention relates to a platinum-containing zeolite. The invention furthermore relates to a method for producing said platinum-containing zeolite according to the invention, to the use of said zeolite as oxidation catalyst and hydrocarbon reservoir and to a catalyst component containing the zeolite according to the invention.

In the early days of exhaust-gas cleaning of combustion engines, only the exhaust gases from petrol engines were cleaned with three-way catalysts (TWC). The nitrogen oxides are reduced with the reductive hydrocarbons (HC) and carbon monoxide (CO).

For about 15 years, attempts have also been made to aftertreat the exhaust gases from diesel engines with catalysts. The exhaust gas from diesel engines contains carbon monoxide, unburnt hydrocarbons, nitrogen oxides and soot particles as air pollutants. The unburnt hydrocarbons comprise paraffins, olefins, aldehydes and aromatics.

An exhaust-gas system for diesel combustion engines generally consists of the following components:
Diesel oxidation catalyst (DOC) for oxidizing hydrocarbons and as cold-start hydrocarbon reservoir;
Diesel particulate filter (DPF) for reducing the particulate emissions;
optionally a hydrolysis catalyst for decomposing urea;
SCR (selective catalytic reduction) catalyst for reducing the nitrogen oxides;
barrier catalyst as ammonia oxidation catalyst.

By DOC (diesel oxidation catalyst) a person skilled in the art understands a catalyst which preferably acts as a cold-start hydrocarbon reservoir and in normal operation oxidizes unburnt hydrocarbons. The treatment of exhaust gases from diesel combustion engines with catalysts requires changes to the design of the catalyst materials as, unlike a petrol engine, a diesel engine is always run with an excess of oxygen and the catalyst is thus never subjected to reductive conditions.

Since the problem of particulate matter became a subject for discussion, particulate filters have still been connected downstream of the DOCs. Particulate filters (DPF, diesel particulate filters) are used to filter out soot particles from the exhaust gas of combustion engines, specifically diesel engines, and thus to reduce their discharge into the atmosphere. Various filter designs, such as e.g. so-called "wall-flow filters" or filters made from ceramic or metal foams, are used. However, the real problem is not the filtration of the soot particles, but the regeneration of the filters used. Depending on the operation-governed composition of the particles, carbon black spontaneously combusts only at temperatures between 500° C. and 700° C.

New-generation particulate filters have to be actively regenerated. This means that such a high temperature must repeatedly be generated on the DOC that the soot on the downstream DPF ignites and burns off. The thermal ageing of the DOCs therefore plays an important role today.

New-generation diesel vehicles are currently fitted, downstream of the diesel particulate filter, with a component which can effect a selective catalytic reduction of nitrogen oxides with the help of a so-called SCR catalyst. SCR (selective catalytic reduction) denotes the selective catalytic reduction of nitrogen oxides from exhaust gases of combustion engines and also power stations. Only the nitrogen oxides NO and NO$_2$ (called NOx in general) are selectively reduced with an SCR catalyst, wherein NH$_3$ (ammonia) is usually admixed for the reaction. Therefore only the harmless substances water and nitrogen form as reaction product.

Therefore, in addition to the oxidation of hydrocarbons, the oxidation of NO to NO$_2$ in the diesel oxidation catalyst is particularly important today. NO$_2$ makes it easier to regenerate the following diesel particulate filter, i.e. the soot burn-off (see for example J. Choo et al., Science of the total environment (2008) 396-401; M. Jeguirim et al. Applied Catalysis B: Environmental, 76 (2007), 235-240 or K. Yamamoto et al., Proceedings of the Combustion institute, article in press). In addition, a mixture of NO/NO$_2$ can be decomposed to nitrogen and air by selective catalytic reduction (SCR) with ammonia more quickly than pure NO (see for example A. Grossale, et al., Journal of Catalysis, 256 (2008), 312 to 322 or M. Schwidder, et al., Journal of Catalysis, 259 (2008), 96 to 103), with the result that here the activity of the DOC also still has to be very high for the oxidation of NO to NO$_2$ after ageing of the catalyst.

Thus, catalysts which, under the operating conditions of the diesel exhaust after-treatment, have a lower tendency to age than has been possible until now in the state of the art are necessary.

In addition to Pt-based catalysts, catalysts which contain both Pt and Pd are also known in the state of the art. Furthermore, DOCs often contain zeolites which serve to store the hydrocarbons when cold (cold-start cases), with the result that the cold-start emissions of hydrocarbons are reduced.

A typical DOC is disclosed for example in EP 800 856 A2. With from 3 to 4 g Pt/l catalyst volume, it contains a high noble metal concentration. In order to achieve as low as possible a light-off temperature for CO and hydrocarbon, however, the majority of the platinum is applied to an amorphous Al/Si mixed oxide, and only a small proportion to the zeolite. According to the state of the art, it has not been possible until now to distribute a very high platinum concentration so homogeneously in the zeolite that it still has a good platinum dispersion even after a higher temperature load. The high platinum content or dispersion effects an adequate stability, which is why in the state of the art the high platinum content has hitherto been introduced into an Al/Si mixed oxide and not into the zeolite.

Platinum-containing zeolites are known in the state of the art. For example, zeolites with very low platinum contents (<1%) are used as catalysts in the refinery sector, e.g. for cyclization, aromatization and cracking reactions. Unlike the conditions that prevail in a diesel exhaust gas, the above-named reactions take place under reductive conditions (i.e. with an excess of hydrocarbon) and therefore require only very low noble metal contents.

The production of platinum-containing zeolites, for example by ion exchange of platinum into the pores of the zeolite, is known in the state of the art. However, this method does not result in platinum concentrations in the zeolite that would be necessary for the use in a diesel oxidation catalyst (see for example J. M. Garcia-Cortes et al., Journal of Catalysis, 218 (2003), 111 to 122; C. Jimenez et al., Applied Catalysis A:

General 249 (2003), 175 to 185 and J. Perez-Ramirez et al., Applied Catalysis B: Environmental 29 (2001), 285 to 298).

DOCs with improved stability are usually also provided by mixed Pt/Pd catalysts. In particular Pt/Pd catalysts with a high Pt proportion (6:1) display a good resistance to thermal ageing. However, a disadvantage is that the oxidation of NO to NO$_2$ deteriorates as the Pd contents increase. Moreover, the Pt/Pd catalysts are clearly less resistant to sulphur (see for example 5th International Exhaust Gas and Particulate Emissions Forum, 19 and 20 Feb. 2008, Ludwigsburg, pages 126 to 144). Such catalysts usually cannot be thermally regenerated after a sulphur poisoning, but still continue to lose activity when they are thermally loaded, i.e. are aged, after the poisoning.

Figure 1:
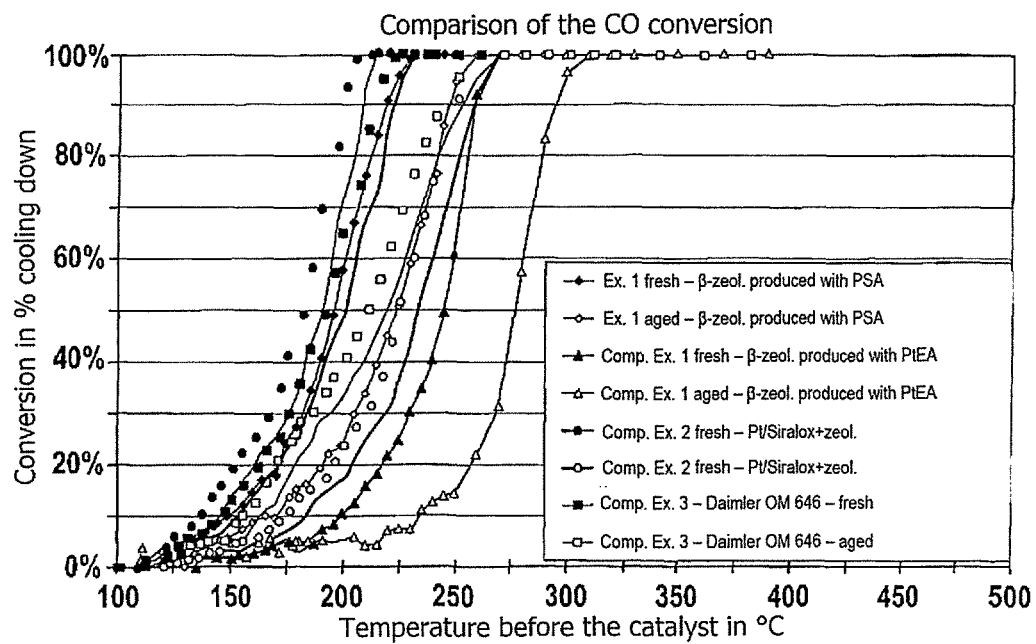
FIG. 1 is a graph depicting the rate of CO conversion of the catalysts according to the invention and the comparison catalysts.

The object of the present invention was thus to provide a method for producing a catalyst, in particular a diesel oxidation catalyst, which has a low tendency to age and a high activity.

The object is achieved by a method for producing a platinum-containing zeolite, comprising the steps
a) impregnating a zeolite with a platinum sulphite solution,
b) calcining the impregnated zeolite under a protective atmosphere.

The calcining is preferably to take place in a protective atmosphere, wherein an argon atmosphere, nitrogen atmosphere or another inert atmosphere is preferably used. An argon atmosphere is particularly preferred.

The calcining of the impregnated zeolite preferably takes place at a temperature of from 600 to 900° C., more preferably from >750 to 850° C., particularly preferably from >750 to 830° C., in particular at about 800° C.

As a result of the calcining, a platinum precursor compound forms which, if necessary, is preferably reduced following the calcining. In principle, however, a reduction can also already take place during the calcining, wherein however a reductive atmosphere would then have to be used instead of the protective atmosphere.

A reduction that can take place following the calcining is preferably carried out using a mixture of a reducing gas (hydrogen, carbon monoxide, ethylene, a methanol, ethanol, etc.) and an inert gas.

Preferred inert gases are for example argon, helium, neon and the like. The inert gas in the reduction step is to be seen as carrier gas, wherein hydrogen or another reductive gas is preferably in a concentration of from 1 to 10 vol.-%, more preferably 3 to 7 vol.-%, particularly preferably about 5 vol.-%, relative to the total volume of reducing gas and inert gas.

The reduction is usually carried out until a complete or almost complete conversion of the platinum precursor compound has taken place. The reduction is preferably carried out over a period of from 3 to 7 hours, more preferably from 4 to 6 hours, particularly preferably about 5 hours.

The reduction is preferably carried out at increased temperatures. The reduction is preferably carried out at a temperature of from 200 to 500° C., more preferably from 250 to 350° C., most preferably about 300° C. For the reduction, the catalyst is usually placed in a catalyst bed and the reducing agent flows through it. The catalyst can likewise be overlaid with the reducing gas and advantageously brought to an increased temperature. The increasing of the temperature can take place for example by heating the catalyst bed. It is likewise possible that the reducing gas is already heated beforehand, for example by heating the gas feed pipe, wherein the heated reducing gas is then conducted over the catalyst to be reduced.

The impregnation of the zeolite with the platinum sulphite solution can take place via an immersion impregnation, spray impregnation or incipient wetness method. The impregnation preferably takes place via an incipient wetness method, although according to the state of the art only a small portion of the metal clusters normally migrates into the pores with this impregnation method and a substantial portion remains on the outer zeolite surface.

However, it was surprisingly found that a catalyst which still has the majority of the platinum in the zeolite pores even after this high temperature loading can be produced by incipient wetness impregnation of the zeolite powder with platinum sulphite acid (PSA) followed by calcining under protective gas at high temperatures. This can be demonstrated in FTIR via an X-ray diffractogram (XRD) and via CO adsorption (after selective poisoning of the Pt clusters on the surface). XRD and FTIR are standard analytical methods in chemistry.

It was also surprisingly found that the thus-produced catalyst has an increased sulphur resistance compared with already known systems. The catalytic activity of the thermally aged catalyst according to the invention is not altered by a sulphur poisoning followed by high-temperature desulphurization.

Although the catalyst developed displays an ageing behaviour that is comparable to existing Pt-based catalysts in respect of the oxidation of carbon monoxide, it was surprisingly found that it has a clearly better stability in respect of the oxidation of NO.

A further advantage of the catalyst produced according to the invention compared with the state of the art is furthermore that the noble metal is applied only to one component, the zeolite, and not to a mixture of zeolite and additional oxidic supports, as in the case of other catalysts. Production steps and thus also costs can thereby be saved.

As a result of the increased zeolite proportion, the hydrocarbon storage capacity is also clearly increased (see for example EP 691 883 B1, U.S. Pat. No. 5,804,155 and EP 830 301). The storage capacity is of great importance if the catalyst has not yet reached the necessary operating temperature and the exhaust gases that form cannot yet burn off.

Thus, a subject of the invention is also a zeolite which is produced in particular using the method according to the invention.

By zeolite" is meant within the framework of the present invention according to the definition of the International Mineralogical Association (D. S. Coombs et al., Canadian Mineralogist, 35, 1979, 1571) a crystalline substance from the group of aluminium silicates with a spatial network structure of the general formula

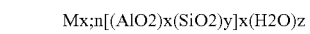

which is composed of $SiO_4/AlO_4$ tetrahedra which are linked by common oxygen atoms to form a regular three-dimensional network.

The Si/Al=y/x ratio is always >1 according to the so-called Lbwenstein rule" which prohibits two neighbouring negatively charged $AlO_4$ tetrahedra from occurring next to each other. Although more exchange sites are available for metals with a small Si/Al ratio, the zeolite increasingly becomes more thermally unstable.

The zeolite structure contains cavities, channels which are characteristic of each zeolite. The zeolites are divided into different structures according to their topology. The zeolite framework contains open cavities in the form of channels and cages which are normally occupied by water molecules and additional framework cations which can be replaced. An aluminium atom attracts an excess negative charge which is compensated for by these cations. The inside of the pore system represents the catalytically active surface. The more aluminium and the less silicon a zeolite contains, the denser the negative charge in its lattice and the more polar its inner surface. The pore size and structure are determined, in addition to the parameters during production, i.e. use or type of templates, pH, pressure, temperature, presence of seed crystals, by the Si/Al ratio (modulus), which constitutes the greatest part of the catalytic character of a zeolite.

The zeolite according to the invention preferably contains at least 2 wt.-% platinum, preferably at least 3 wt.-%, most preferably 3.5 or more wt.-% platinum, wherein at least 90% of the platinum is located in the pores of the zeolite, more preferably at least 95%, in particular preferably at least 99%.

The zeolite is preferably selected from the groups consisting of the types AEL, BEA, CHA, EUO, FAU, FER, KFI, LTA, LTL, MAZ, MOR, MEL, MTW, LEV, OFF, TON and MFI. The BEA structure is particularly preferred.

The zeolite preferably has an $SiO_2/Al_2O_3$ modulus of from 5 to 300, more preferably from 10 to 200, most preferably from 15 to 100.

The zeolite according to the invention is characterized by a Pt—C=O stretching vibration of between 2070 and 2110 $cm^{-1}$, preferably from about 2080 to 2095 $cm^{-1}$. The stretching vibration is present even after a poisoning with adamantane carbonitrile. Adamantane carbonitrile is a sterically demanding molecule which, because of its size, cannot penetrate the pore system of the zeolite. Therefore only Pt clusters on the outer surface of the [zeolite] are poisoned by the adsorption of adamantane carbonitrile. If CO is adsorbed following this poisoning, this can only bind to the unpoisoned Pt clusters inside the zeolite. The presence of the Pt—C=O stretching vibration after the poisoning with adamantane carbonitrile proves that the Pt sits in the pores of the zeolite. The remaining intensity after a poisoning is about 2 to 4 times higher than with a comparison catalyst.

The zeolite according to the invention is furthermore free of Pt reflexes in the X-ray diffractogram (XRD). This likewise shows that the platinum sits in the pores of the zeolite.

A further subject of the invention is the use of the zeolite according to the invention as oxidation catalyst and hydrocarbon reservoir. Zeolites are known as hydrocarbon reservoirs. In combination with the high platinum dispersion in the pores of the zeolite, however, it is also pre-eminently suitable as oxidation catalyst with corresponding accumulated hydrocarbon reservoir function. Because platinum is applied only to a zeolite and not, as known in the state of the art, to other metal oxides, a simple catalyst system which can be produced at favourable cost results.

The zeolite according to the invention can advantageously be processed to a washcoat and be accordingly applied to a catalyst support body. A person skilled in the art knows how such a washcoat can be produced. The necessary coating techniques for coating a catalyst support body are also known to a person skilled in the art. Thus e.g. the impregnated and dried zeolite is processed to an aqueous coating dispersion. A binder, e.g. silica sol, can be added to this dispersion. The viscosity of the dispersion can be set by the appropriate additives, with the result that it becomes possible to apply the necessary quantity of coating to the walls of the flow channels in a single work step. If this is not possible, the coating can be repeated several times, wherein each freshly applied coating is fixed by an intermediate drying and, where necessary, is calcined.

For the exhaust-gas cleaning of diesel engines, coating quantities of from 50 to 500 g/l, preferably 250 to 350 g/l, volume of the catalyst support body are advantageous.

A further subject of the invention is a catalyst component which contains a zeolite according to the invention. It is preferred that the zeolite is present as coating on the support.

A metallic or ceramic monolith, a non-woven or metal foam can be used as catalyst support. Other catalyst shaped bodies or catalyst support bodies known in the state of the art are also suitable according to the invention. A metallic or ceramic monolith that has a plurality of parallel passage openings which are provided with the washcoat coating is particularly preferred. The support body preferably has passage openings with round, triangular, square or polygonal cross-section. The support is particularly, preferably formed as monolithic honeycomb body.

Metallic honeycomb bodies are often formed from sheet metals or metal foils. The honeycomb bodies are produced for example by alternating arrangement of layers of structured sheets or foils. Preferably, these arrangements consist of a layer of a smooth sheet alternating with a corrugated sheet, wherein the corrugation can be formed for example sinusoidal, trapezoidal, omega-shaped or zigzag-shaped. Suitable metallic honeycomb bodies and methods for their production are described for example in EP 0 049 489 A1 or DE 28 56 030 A1.

In the field of catalyst support bodies, metallic honeycomb bodies have the advantage that they heat up more quickly and thus catalyst support bodies based on metallic substrates normally display a better response behaviour in cold-start conditions.

The honeycomb body preferably has a cell density of from 30 to 1500 cpsi, particularly preferably from 200 to 600 cpsi, in particular about 400 cpsi.

The catalyst support body to which the catalyst according to the invention can be applied can be formed from any metal or a metal alloy and be produced e.g. by extrusion or by coiling or stacking or folding of metal foils. In the field of exhaust-gas cleaning, temperature-resistant alloys with the main constituents iron, chromium and aluminium are known. Monolithic catalyst support bodies that can be freely flowed through with or without internal leading edges for the agitation of the exhaust gas or metal foams which have a large internal surface area and to which the catalyst according to the invention adheres very well are preferred for the catalyst according to the invention. However, catalyst support bodies with slits, holes, perforations and impressions in the metal foil can also be used.

In the same way, catalyst support bodies made of ceramic material can be used. Preferably, the ceramic material is an inert material with a small surface area, such as cordierite, mullite, aluminium titanate or a-aluminium oxide. However, the catalyst support used can also consist of support material with a large surface area, such as y-aluminium oxide.

A metal foam, for example a metallic open-pored foam material, can also be used as catalyst support body. Within the framework of the present invention, by the term "metallic open-pored foam material" is meant a foam material made of any metal or of any alloy which can optionally also contain additives and which has a plurality of pores which are connected to each other by conduit, with the result that for example a gas can be conducted through the foam material.

Metallic open-pored foam materials have a very low density because of the pores and cavities, but have a substantial stiffness and strength. The production of metal foams takes place for example by means of a metal powder and a metal hydride. Both powders are normally admixed together and then compacted to a shaped material by hot pressing or extrusion. The shaped material is then heated to a temperature above the melting point of the metals. The metal hydride releases hydrogen gas and the mixture foams.

However, there are also still other possibilities for producing metal foams, for example by blowing gas into a metal melt which has previously been made foamable by adding solid constituents. For aluminium alloys for example, 10 to 20 vol.-% silicon carbide or aluminium oxide is added for the stabilization. In addition, open-pored metallic foam structures with a pore diameter of from 10 ppi to approximately 50 ppi can be produced by special precision casting techniques.

The support can in principle also be extruded and injection moulded. Here too, metallic and ceramic materials are possible, wherein in the case of the ceramic materials for example moulding accessories are added and for example also binding agents and other additives. Extruded supports can assume any geometries, preferably those named above.

The invention will now be described in more detail with the help of some embodiment examples which are not to be considered as limiting the scope of the invention.

Embodiment Examples

EXAMPLE 1

The catalyst according to the invention is produced according to the following procedure:

First, the water absorption of a dried zeolite was determined (H-BEA-35:commercial product of Sud-Chemie AG). It was 92.3%.

24.1 g of a platinum sulphite solution (10.17 wt.-% Pt content) was topped up to 62.3 g with distilled water. In a mortar, 67.55 g of the dried zeolite was impregnated with this solution. The platinum concentration was 3.5 wt.-%. The moist powder was dried at 120° C. and then calcined for 5 hours at 800° C. under protective gas (V=2 l/min) and reduced with 5% $H_2$ in N2 for 5 h at 300° C.

70 g of the powder was suspended in 230 ml water with the help of an Ultra-Turrax stirrer. The suspension was milled to a particle size of $d_{50}$ 2 pm with a planetary ball mill (Retsch PM 100) with 10-mm balls of yttrium-stabilized Zr oxide. A cordierite honeycomb (400 cpsi) was coated with this washcoat and calcined, with the result that at the end 3.5 g Pt/L honeycomb volume was contained on the honeycomb.

EXAMPLE 2

In order to study the influence of the reduction, a second honeycomb was coated with an unreduced catalyst (otherwise analogous to Ex. 1).

COMPARISON EXAMPLE 1

As comparison, the same synthesis was carried out with ethanolammonium hexahydroxoplatinate solution (13.59 wt.-% Pt content) as Pt source. The Pt concentration was likewise 3.5 wt.-%.

COMPARISON EXAMPLE 2

A DOC was produced according to the following procedure on the basis of DE 10 2007 057 305 and EP 800 856 B1:

The water absorption of a mixed oxide of aluminium oxide and silicon oxide (Siralox 5/140, 5% Si, from Condea) was first determined. It was 53.86%. 110.4 g of a solution of ethanolammonium hexahydroxoplatinate (13.59% Pt content) was topped up to 161.6 ml (with dist. $H_2O$). 300 g of the Siralox powder was impregnated with this solution in a planetary mixer. The moist powder was dried in the oven for 3 h at 80° C. and then calcined for 3 h at 550° C.

140 g of the powder was suspended in 700 ml water with the help of an Ultra-Turrax stirrer. The suspension is milled to a particle size $d_{50}$ 3 pm with a bead mill (Dynomil from WAB) with 1 1.2-mm beads of Zr/Ce oxide. To this finely milled dispersion of Pt/Siralox, 140 g of a B-zeolite exchanged with iron (3% $Fe_2O_3$, B-35 zeolite) was added and the suspension topped up to 1400 ml, with the result that a coating washcoat containing 20% solids formed. A cordierite honeycomb (400 cpsi) was coated with this washcoat and calcined, with the result that at the end 3.5 g Pt/l honeycomb volume was contained on the honeycomb.

COMPARISON EXAMPLE 3

To compare the catalytic activity and the ageing, a DOC, customary in the trade, of a Daimler OM646 engine was additionally used.

COMPARISON EXAMPLE 4

Pt/Pd (4:1) catalyst:

The water absorption of a mixed oxide of aluminium oxide and silicon oxide (Siralox 5/140 type C with very large pores and 5% Si from Condea) was first determined. It was 151%. 67.39 g of a solution of ethanolammonium hexahydroxoplatinate (13.85% Pt content) was topped up with 58 ml distilled water. In a planetary mixer, 186 g of the Siralox powder was impregnated with this solution in a first step. 17.34 g of a palladium nitrate solution was then diluted with 58 ml water and in the next step further added dropwise as impregnating solution to the moist powder in the planetary mixer. The moist powder was dried in the oven for 3 h at 80° C. and then calcined for 3 h at 550° C. The powder contained 7% noble metal in total.

140 g of the powder was suspended in 700 ml water with the help of an Ultra-Turrax stirrer. The suspension was milled to a particle size $d_{50}$ 3 pm with a bead mill (Dynomil from WAB) with 1-1.2-mm beads of Zr/Ce oxide. A cordierite honeycomb (400 cpsi) was coated with this washcoat and calcined, with the result that at the end 3.5 g noble metal/L honeycomb volume was contained on the honeycomb.

COMPARISON EXAMPLE 5

Pt Catalyst without Zeolite:

The water absorption of a mixed oxide of aluminium oxide and silicon oxide (Siralox 5/140 type C with very large pores and 5% Si from Condea) was first determined. It was 151%. 73.6 [g] of a solution of ethanolammonium hexahydroxoplatinate (13.59% Pt content) was topped up to 181 ml with distilled water. 200 g of the Siralox powder was impregnated with this solution in a planetary mixer. The moist powder was dried in the oven for 3 h at 80° C. and then calcined for 3 h at 550° C.

100 g of the powder was suspended in 200 ml water with the help of an Ultra-Turrax stirrer. The suspension was milled to a particle size of $d_{50}$ 3 pm with a planetary ball mill (Ra. Retsch) with 10-mm beads of Zr oxide. To empty the mill container, another 200 g water was added. A cordierite honeycomb (400 cpsi) was coated with this washcoat and calcined, with the result that at the end 3.5 g Pt/l honeycomb volume was contained on the honeycomb.

EXAMPLE 6

Comparison Test of the Catalysts:

The catalyst honeycombs produced in Examples 1 and 2 and the comparison examples were tested for the oxidation of CO, propylene and NO in a reactor under the following conditions:

| Space velocity: 70 000 h$^{-1}$ | |
|---|---|
| CO: NO: | 500 ppm |
| Propylene: | 500 ppm |
| Oxygen: | 500 ppm |
|  | 5% |
| Water vapour: | 10% |
| CO2: | 70-90 ppm |
| Nitrogen: | Remainder |

The catalyst honeycomb was introduced with a ceramic fibre blanket into a quartz glass tube. The gas stream was heated up electrically before the catalyst. For the test, the catalyst was first operated for 30 min under these gas conditions at 390° C. and then cooled down in steps of 20° C. Each temperature was maintained for 8 min and the product composition determined between 7 and 8 min. Below 250° C., the cooling down took place in 5° C. steps in order to be able to more precisely determine in particular the CO light-off temperature (50% CO conversion).

After this test, air with 10% water vapour flowed through the catalyst at a space velocity of 5000 h$^{-1}$ and was heated up under these gas conditions to 750° C. (measured in the monolith) within 2 h. Under these conditions, the catalyst was then aged for 10 h. The above-described measurement was then repeated.

FIG. 1 shows the rate of CO conversion of the catalysts according to the invention and the comparison catalysts. Tab. 1 shows the light-off temperatures taken from FIG. 1 (50% CO conversion).

TABLE 1

| CO light-off temperatures (50% conversion) | | |
|---|---|---|
| Example | CO LOT fresh [OC] | CO LOT aged [OC] |
| Ex. 1 | 196 | 225 |
| Ex. 2 | 189 | 224 |
| Comp. Ex. 1 | 245 | 278 |
| Comp. Ex. 2 | 191 | 233 |
| Comp. Ex. 3 | 200 | 220 |

It can clearly be seen that the pure zeolite catalyst which also has Pt on the surface in larger clusters, which was unavoidable due to the production with PtEA impregnation (comparison example 1), is clearly poorer than the catalyst according to the invention.

It can also be seen that the catalyst according to the invention is comparable in respect of the CO light-off temperatures to DOCs customary in the trade (cf. Ex. 3) and reproduced state of the art DOCs (cf. Ex. 2) which are based on amorphous Al/Si mixed oxides as platinum support, both in the fresh state and after ageing. Moreover, it can be seen from the comparison of Examples 1 and 2 that a reduction of the catalyst before the reaction plays no role here. Such effects are removed for the catalysts according to the invention by the test conditions of 30 min under an oxidizing gas mixture at 390° C. Thus catalysts with Pt(O) or oxidic precursor can be used.

Figure 2:
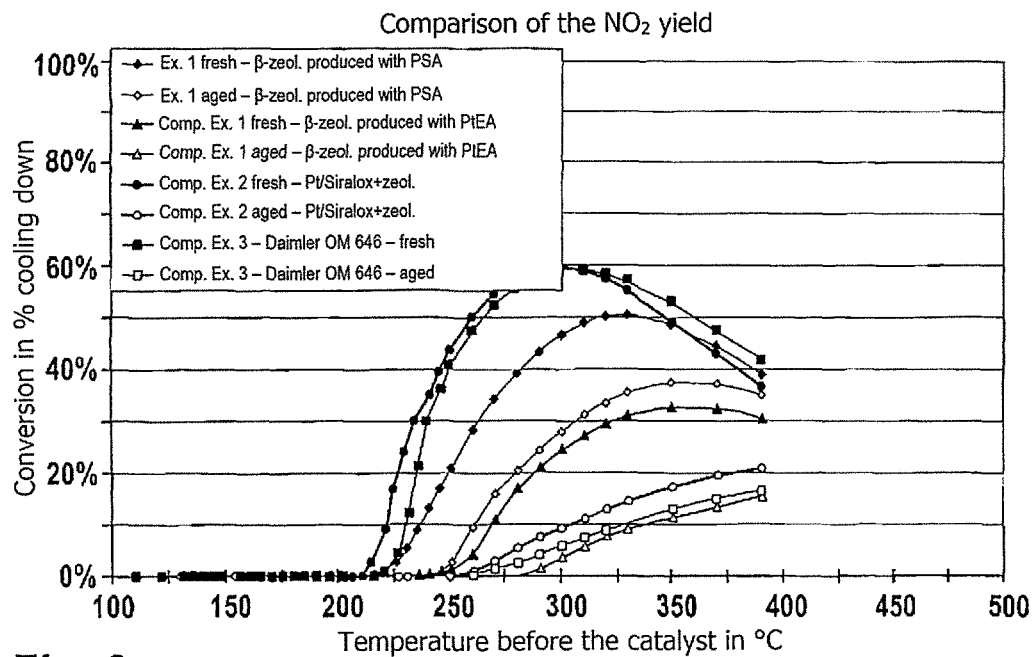
FIG. 2 is a graph depicting the $NO_2$ yield of the catalysts according to the invention and the comparison catalysts.

FIG. 2 and Tab. 2 show the NO$_2$ yield of these catalysts. A high NO$_2$ yield is desired for the passive regeneration of a DPF which is connected downstream of a DOC and, in the case of an SCR stage, for nitrogen oxide reduction, after this DOC.

TABLE 2

| Maximum NO$_2$ yield | | |
|---|---|---|
| Example | Max. NO2 yield [%] fresh | Max. N02 yield [%] aged |
| Ex. 1 | 50 | 37 |
| Ex. 2 | 52 | 33 |
| Comp. Ex. 1 | 32 | 15 |
| Comp. Ex. 2 | 60 | 21 |
| Comp. Ex. 3 | 59 | 16 |

It can clearly be seen that only the catalyst according to the invention still has a relatively high activity for the oxidation of NO to NO$_2$ after ageing with 37 and 33% NO$_2$ yield.

EXAMPLE 7

Comparison Test Under Sulphur Ageing:

As it is known that Pt/Pd catalysts are more age-resistant but on the other hand more sensitive to sulphur than pure platinum catalysts are, another test with sulphur poisoning after ageing was carried out after the ageing.

For this purpose, as described in Example 6, an activity test was first carried out decreasing from 390° C., then the ageing, as described in Example 6, and then again a test after the thermal ageing. A gas mixture of 20 ppm SO2 in air was then conducted over the catalyst at 250° C. for 2 h at a space velocity of 5000 h$^{-1}$. An activity measurement, cooling down starting from 390° C., was then carried out again. The catalyst was then desulphurized again under air with 10% water vapour at a space velocity of 5000 h$^{-1}$ by heating up from 150° C. to 750° C. over a period of 1 h and then maintained at 750° C. for 15 min. After this high-temperature desulphurization, a fresh activity test was carried out cooling down starting from 390° C., as described in Example 6.

Tab. 3 shows the CO light-off temperatures for the different catalysts:

TABLE 3

| CO light-off temperatures after SO$_2$ ageing | | | | | |
|---|---|---|---|---|---|
|  |  | CO light-off temperature [OC] | | | |
| Example | Composition | fresh | 750° C. aged | 250° C. 2 h + S02 | 750° C. 15 min desulphurized |
| Ex. 1 | Pt/5-zeolite according to invention | 196 | 225 | 237 | 218 |
| Comp. Ex. 4 | Pt/Pd (Siralox) | 180 | 165 | 178 | 166 |
| Comp. Ex. 5 | Pt/Siralox | 198 | 225 | 230 | 236 |

It can clearly be seen that the catalyst according to the invention here behaves very similarly to the pure platinum catalyst according to the state of the art on amorphous Al/Si oxide (Comp. Ex. 5). The Pt/Pd catalyst (Comp. Ex. 4) is substantially more thermostable. The optimum Pt/Pd alloy was still not formed by calcining at 550° C. during the production, with the result that the catalyst actually became better during the 750° C. ageing. It can also be seen that the sulphur poisoning is almost reversible for the CO oxidation both for the Pt/Pd catalyst and for the catalyst according to the invention. The great advantage of the Pt catalyst according to the invention, however, is seen when the NO oxidation is considered. The maximum $NO_2$ yields are shown in Table 4.

TABLE 4

NO oxidation after sulphur ageing

| | | Maximum NO2 yield in [%] | | | |
|---|---|---|---|---|---|
| Example | Composition | fresh | 750° C. aged | 250° C. 2 h + S02 | 750° C. 15 min desulphurized |
| Ex. 1 | Pt/5-zeolite according to invention | 50 | 37 | 39 | 37 |
| Comp. Ex. 4 | Pt/Pd (4:1) | 51 | 43 | 38 | 28 |
| Comp. Ex. 4 | Pt/Siralox | 56 | 21 | 22 | 22 |

It can clearly be seen that the catalyst according to the invention displays a lower thermal ageing than the pure platinum catalyst (Comp. Ex. 5), but remains unchanged after this thermal ageing independently of the sulphur. Although the Pt/Pd catalyst (Comp. Ex. 4) is also thermally more stable, it is still deactivated by sulphur even after the dramatic thermal ageing. Specifically when the catalyst is heated to a high temperature after a loading with sulphur, it is strongly deactivated for the NO oxidation during the desulphation process. The fact that a desulphation reaction has actually taken place can be seen from the fact that the CO oxidation has again improved (Tab. 3, Comp. Ex. 4). During this desulphation process, however, the Pt/Pd catalyst was again substantially deactivated for the NO oxidation (max. $NO_2$ yield 28%). This deactivation is not to be observed with the catalyst according to the invention, but is very relevant in practice. If a DOC in a system with actively regenerated DPF must often generate high temperatures by hydrocarbon burn-off for the DPF regeneration, this deactivation is very decisive. In the normal operating phases of the catalyst between the regenerations, the catalyst always operates at lower temperature (0 500° C.) in $3O_2$-containing exhaust gas. It is here loaded with $SO_2$. Each active regeneration means a rise in temperature with very high temperature and leads to the deactivation described here of the Pt/Pd catalysts according to the state of the art, but not to a deactivation of the catalyst according to the invention.

EXAMPLE 8

Determination of the Pt Distribution

In order to determine the Pt distribution on the zeolite, an IR spectroscopic method was developed. The method is based on the comparison of the Pt—C=O stretching vibration before and after the adsorption of 1-adamantane carbonitrile. 1-adamantane carbonitrile is a sterically demanding molecule which, because of its size, cannot penetrate the pore system of the zeolite and therefore binds selectively to the Pt clusters on the outer surface. If the quantity of carbon monoxide which binds to the Pt clusters before and after the poisoning is compared, the distribution of the Pt can be determined.

Measurement Procedure:

A moulding with approximately 20 mg was produced from the Pt zeolite powder. This moulding was dried over night before the measurement at 400° C. in high vacuum ($10^{-7}$ mbar).

Before the measurement of the reference spectrum, 20 mbar carbon monoxide was adsorbed on the sample. The first measurement of the total adsorbed CO quantity was then carried out. (Integral of the CO peak). Before the poisoning, the sample was thermally treated anew at 400° C. in order to desorb the carbon monoxide and thus make possible the poisoning with 1-adamantane carbonitrile. For the poisoning, 2.5 mbar of the nitrile was absorbed and then 20 mbar CO was added anew in metered doses. After approximately 10 min, the comparison spectrum was measured.

Figure 3:
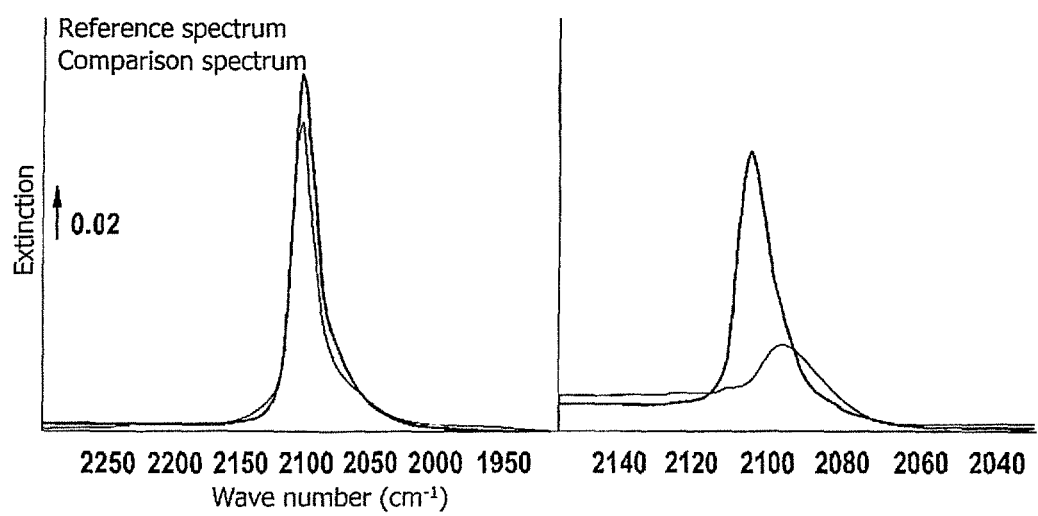
FIG. 3 is a graph depicting the IR spectra of PSA-BEA and PtEA-Bea before and after the poisoning with 1-adamantane carbonitrile.

FIG. 3 shows the IR spectra of PSA-BEA and PtEA-Bea before and after the poisoning with 1-adamantane carbonitrile.

The left-hand spectrum shows the catalyst according to the invention, the right-hand one the catalyst according to comparison example 1, produced with ethanolammonium hexahydroxoplatinate. The catalyst according to the invention adsorbs approximately the same quantity of carbon monoxide both in the original and in the poisoned state. This means that the platinum is not accessible for the nitrile and consequently is located inside the zeolite (in the pores). In contrast, the catalyst poisoned with adamantane nitrile according to comparison example 1 clearly adsorbs less CO than the unpoisoned catalyst. This means that the Pt distribution on the two zeolites is different and correlates to both the activity and the stability of the two catalysts. It is thus clearly of advantage to introduce all of the platinum into the internal pore system of the zeolite.

The different Pt distribution is additionally confirmed by XRD measurements. The spectrum of the catalyst according to the invention displays no Pt reflexes, whereas the spectrum of the catalyst according to comparison example 1 displays clear reflexes.

The invention claimed is:

1. Method for producing a catalyst component comprising a platinum-containing zeolite disposed on a support, the method comprising the steps of:
    impregnating a BEA zeolite with a platinum sulphite solution via an incipient wetness method, then
    calcining the impregnated zeolite under an inert atmosphere selected from argon, helium, neon and nitrogen atmospheres and mixtures thereof, and
    disposing the impregnated zeolite on the support,
wherein platinum is impregnated only on the zeolite, and wherein at least 90% of the platinum of the catalyst component is disposed in pores of the platinum-containing zeolite.

2. Method according to claim 1, wherein the calcining takes place in an argon, atmosphere.

3. Method according to claim 1, wherein the calcining takes place at a temperature of from 600 to 900° C.

4. Method according to claim 1, wherein a reduction takes place following the calcining.

5. Method according to claim 4, wherein the reduction takes place with a mixture of reducing gas and an inert gas.

6. Method according to claim 4, wherein the reduction takes place over a period of from 3 to 7 hours.

7. Method according to claim 4, wherein the reduction takes place at a temperature of from 200 to 500° C.

8. Method according to claim 1, wherein the BEA zeolite has an $SiO_2/Al_2O_3$ modulus of from 5 to 300.

9. Method according to claim 1, wherein the impregnated zeolite is disposed on the support after the calcining step.

10. Method according to claim 9, wherein disposing the impregnated zeolite on the support comprises forming a liquid suspension of the impregnated zeolite; coating the liquid suspension on the support, and drying the coated support.

11. Method according to claim 1, wherein at least 95% of the platinum of the catalyst component is disposed in pores of the platinum-containing zeolite.

12. Method according to claim 1, wherein the BEA zeolite has an $SiO_2/Al_2O_3$ modulus of from 15 to 100.

13. Method according to claim 1, wherein the impregnated zeolite is disposed on the support in an amount in the range of 5 to 500 g per liter volume of the support.

14. Method according to claim 1, wherein the platinum-containing zeolite includes at least 3 wt % platinum.

* * * * *